United States Patent [19]

Okuno et al.

[11] 4,109,257
[45] Aug. 22, 1978

[54] REFLEX CAMERA WITH A BUILT-IN EXPOSURE METERING APPARATUS

[75] Inventors: Youichi Okuno, Yokohama; Takehiko Kiyohara, Zama; Tokuichi Tsunekawa, Yokohama; Teiji Hashimoto, Kawasaki, all of Japan

[73] Assignee: Canon Kabushiki Kaisha, Tokyo

[21] Appl. No.: 721,368

[22] Filed: Sep. 8, 1976

Related U.S. Application Data

[63] Continuation of Ser. No. 579,879, May 22, 1975, abandoned.

[30] Foreign Application Priority Data

May 31, 1974 [JP] Japan .................................. 49-61542

[51] Int. Cl.² .................................................. G03B 7/00
[52] U.S. Cl. ...................................... 354/23 R; 354/56
[58] Field of Search .................... 354/22, 23, 54, 55, 354/56, 219, 224, 225

[56] References Cited

U.S. PATENT DOCUMENTS

| 3,451,323 | 6/1969 | Uno et al. ........................... 354/56 |
| 3,575,095 | 4/1971 | Keck ................................... 354/56 |

FOREIGN PATENT DOCUMENTS 1,203,872   9/1970   United Kingdom ...................... 354/54

*Primary Examiner*—L. T. Hix
*Assistant Examiner*—M. L. Gellner
*Attorney, Agent, or Firm*—Toren, McGeady and Stanger

[57] ABSTRACT

In a reflex camera having a penta prism positioned in the view-finder thereof, there is provided a glass member having a reflactive index equal to or larger than that of the penta prism and positioned in intimately contacting relation with the exit surface of said penta prism to utilize that portion of a view-finder image forming light beam which is directed to the exit surface of said penta prism after successive reflection from the two roof surfaces, the front reflection surface and again the roof surfaces of the penta prism such light beam portion would be otherwise subject to the total reflection from the exit surface in vain in measuring the light at a central portion of the view-finder image as well as at any portions outside thereof. In this way it being made possible to operate the camera selectively in a spot-metering mode or overall field of view light metering mode by the use of a single light value sensing means without causing the reduction of quality of the view-finder image.

7 Claims, 9 Drawing Figures

REFLEX CAMERA WITH A BUILT-IN EXPOSURE METERING APPARATUS

This is a continuation of application Ser. No. 579,879 filed May 22, 1975, now abandoned.

BACKGROUND OF THE INVENTION

This invention relates to reflex cameras with built-in exposure metering apparatus, and, more particularly, to an improvement in a light meter arrangement for a single lens reflex camera. Still more particularly, it relates to the provision of a glass member positioned in contacting relation behind the exit surface of a penta-prism of the camera so that a light value sensing means may be positioned to detect those portions of the light radiated from an object image formed on a focusing screen under the penta-prism which emanate from an upper portion of the exit surface of the penta-prism both after successive reflection from the two roof surfaces and one of the front reflection surfaces and after successive reflection from the two roof surfaces, one of the front reflection surfaces and again one of the roof surfaces.

It is known in the art to utilize that portion of the light radiated from the image which, after successive reflection from the two roof surfaces and one of the front reflection surfaces, is directed to one of the roof surfaces in measuring the light by use of light value sensing means positioned adjacent the roof surface in a photometric light path passing through a light-permeable portion thereof. This arrangement has a drawback in that the light-permeable portion must be located outside that portion of the roof surface from which a view-finder image forming light beam is directed to an eye-piece behind the exit surface of the penta-prism. Otherwise the entire image can not be viewed by the photographer looking through the eye-piece. In order to avoid introduction of any bad influence into the view field of the finder, therefore, it is required that the penta roof surfaces be of relatively large areas. Conversely, with a penta-prism of which the size of minimized under the condition that the light radiated from the image is only directed to the eye-piece, it is impossible to utilize any portion of the light reflected from the front reflection surface in measuring the light without introducing any bad influence to the view-field of the finder.

Also, it is known to measure the light from the image at two portions laterally spaced from each other by use of two light value sensing means positioned respectively on the right and left sides of the eye-piece. In making an average exposure determination by taking into account the light values measured at upper and lower portions of the image, however, it is impossible to position two light value sensing means respectively on the upper and lower sides of the eye-piece without unduly increasing the area of the exit surface of the penta-prism which in turn causes an objectionable increase in the bulk and weight of the penta-prism.

SUMMARY OF THE INVENTION

Accordingly, the present invention has for its general object to provide an exposure metering apparatus for a single lens reflex camera which is free from all of the conventional drawbacks.

An object of the present invention is to provide an exposure metering apparatus which utilizes that portion of the light radiated from the image which, after successive reflection from the two roof surfaces, the front reflection surface and again one of the roof surfaces, is directed to the exit surface, and accordingly which would be otherwise subject to the total reflection from the exit surface, whereby it being made possible to measure the light at a central portion of the image as well as at any portions outside the central portion without causing the reduction of quality of the view-finder image which would be otherwise caused in the prior art.

Another object of the invention is to provide an exposure metering apparatus which permits selective metering operations in a spot-metering mode and overall field of view light metering mode by use of a single light value sensing means.

Still another object of the present invention is to provide an exposure metering apparatus which can measure the light from the image at upper and lower portions thereof without unduly increasing the area of the exit surface of the penta-prism of the camera.

To achieve these objects, the present invention contemplates the use of a glass member positioned in intimate contacting relation with the exit surface of the penta-prism for permitting that portion of the light radiated from the image which enters the entrance surface of the penta-prism and is then directed through the penta-prism to the exit surface thereof after reflection from the two roof surfaces, the front reflection surface and again the roof surfaces successively, and which would be otherwise totally reflected therefrom in the penta-prism body, to be detected by light value sensing means positioned adjacent the glass member to measure the light.

Other objects, features and advantages of the present invention will become apparent from the following detailed description taken in conjunction with the accompanying drawings in which:

DETAILED DESCRIPTION OF THE EMBODIMENTS

Figure 1:
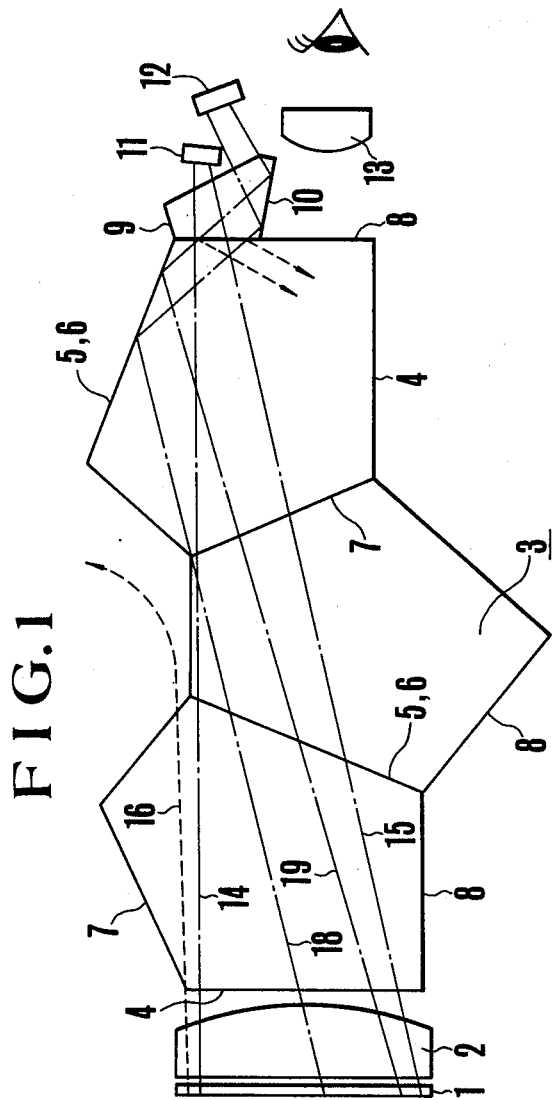
FIG. 1 shows photometric light paths through the basic components of a view-finder in a single lens reflex camera according to one embodiment of the present invention.
Figure 2:
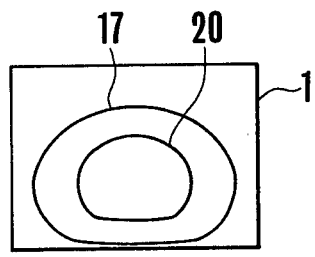
FIG. 2 is a top view of a focusing screen of the view-finder of FIG. 1, illustrating different areas of influence on the two light-value sensing means of FIG. 1 of light radiating from the image formed thereon.
Figure 3:
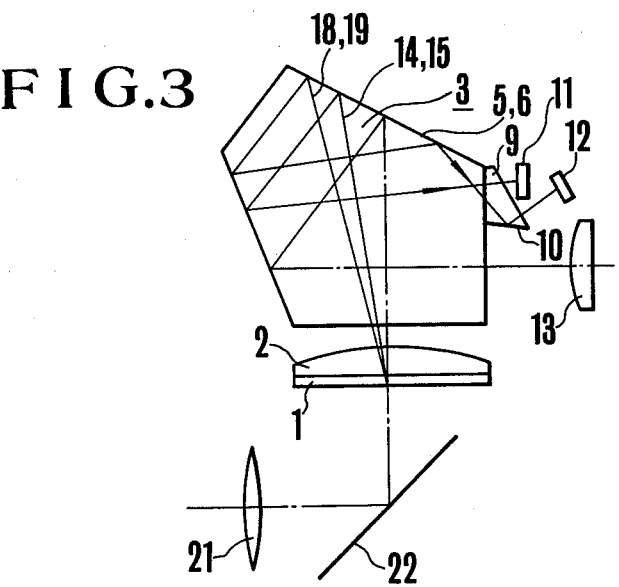
FIG. 3 is a schematic sectional view of the components of the finder of FIG. 1.
Figure 8:
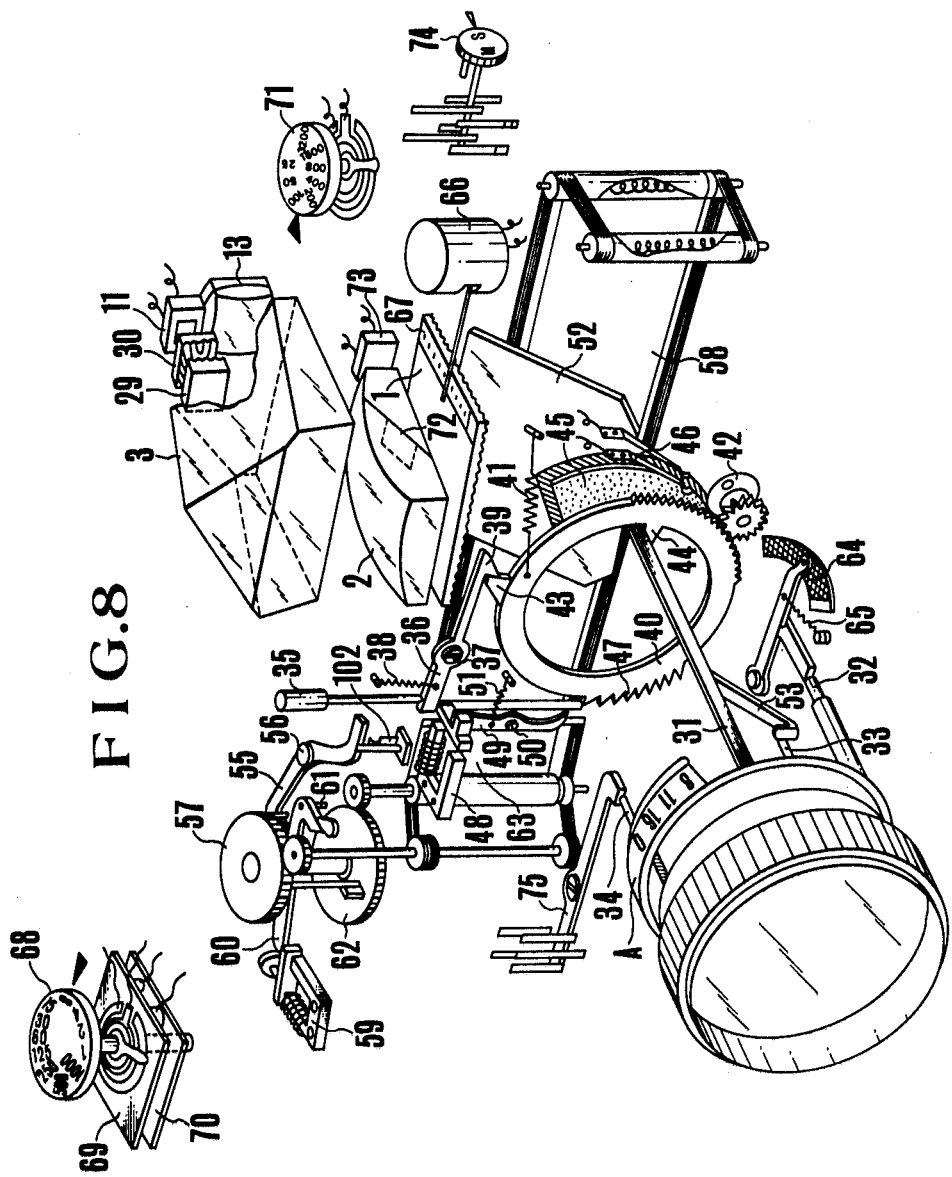
FIG. 8 is a perspective view of the essential components of the various mechanisms of a single lens reflex camera with a lens mount of FIG. 7 employing an exposure metering apparatus of the invention.

Referring to FIGS. 1, 2 and 3 in view of FIG. 8, there is schematically shown an arrangement of the basic components of a view finder in a single lens reflex camera, wherein a tiltable mirror 52 located between an objective lens in a lens barrel having a diaphragm selecting ring A and a focal plane shutter 58, in its reflecting position, reflects light entering through the objective lens upward onto a focusing screen 1, where an image of the object to be photographed is formed. Light radiating from the image is radiated upward through a condenser lens 2 into the entrance surface 4 of a pentaprism 3. In addition to the entrance surface 4, this pentaprism 3 has two roof surfaces 5 and 6, two front reflection surfaces one of which is indicated at 7, and an exit surface 8. A supplementary optical means of the invention in the form of a glass block 9 is positioned on the exit surface 8 at an upper portion in intimately contacting relation thereto. The refractive index of the glass block 9 is preferably almost equal to that of the pentaprism 3. The glass block 9 is provided with a totally reflecting surface 10. Positioned behind the lower portion of the exit surface 8 is an eye-piece 13 which enables the photographer to view the image formed on the screen 1. There is further provided first and second light value sensing means 11 and 12 such as cadmium sulfide photoconductive elements, or silicon photocells positioned to detect light radiating from the image on the focusing screen 1, the first sensing means 11 being responsive to such light as is radiated from the area of the image circumscribed by a somewhat elliptical closed curve 17 and the second sensing means 12 being responsive to such light as is radiated from the area of the image circumscribed by a smaller somewhat elliptical closed curve 20 concentric to the closed curve 17.

As shown in FIG. 1, wherein the three cross-sectional areas of the penta prism 3 are shown as taken in respective planes each containing an axial rays and parallel to the axis of the objective lens, boundary rays of light 14 and 15 from the area 17 after having entered the entrance surface 4 are reflected from the two roof surfaces 5 and 6 and the front reflection surface 7 to an upper portion of the exit surface 8 and therefrom are directed through the glass block 9 to the first sensing means 11, whilst boundary rays of light 18 and 19 after having entered the entrance surface 4 are reflected from the two roof surfaces 5 and 6, the reflection surface 7 and again the roof surface 5 or 6 to an upper portion of the exit surface 8, and therefrom are directed through the block 9 to the second sensing means 12 after reflection from the total reflection surface 10. If the glass block 9 does not exit, the rays 18 and 19 are totally reflected from the exit surface 8 as indicated by dashed line arrows which was valid in the prior art. A ray of light 16 radiating from a point in an upper portion outside of the area 17 can not reach the first sensing means 11 because of the cut out of the penta-prism 3. It is now to be noted that the first sensing means 11 operates in an overall field of view light metering mode, while the second sensing means 12 operates in a spot metering mode.

One of the advantages of the exposure metering apparatus of FIGS. 1, 2 and 3 is that the provision of two light value sensing means assists in improving the accuracy and reliability of the light value measurement despite the fact that the light value sensing means are not positioned in or adjacent the focusing screen so as to minimize the influence on the accuracy and reliability of the light value measurement of change of the exit pupil position due to the employment of an interchangeable objective lens of different focal length and largest aperture size, or the influence thereon of variation of the aperture size with the same objective lens.

Another advantage is that the combination of the outputs of the two light value sensing means provides a central spot weighted light value.

Still another advantage deriving either from the combination with a light shielding means removably inserted in at least one of the light paths to the first and second light value sensing means, or from the combination with switch means operable to connect either or both of the first and second sensing means to an exposure determining means is that the camera may be selectively operated either in a spot-metering mode, or in an overall field of view light metering mode, or in a center spot weighted overall field of view light metering mode.

In practicing the invention, it is preferred that the first and second light value sensing means are provided with respective focusing or collector lenses as positioned in front thereof. With this arrangement, it is preferred that the primary focal point of each of the collector lenses coincides with the focusing screen, or the diaphragm position of the objective lens, while the secondary focal point coincides with the light receiving surface of the sensing means. Further, it is preferred that these collector lenses are arranged to be movable along and/or across the photometric light path, thereby the size and location of the image formed on each of the light receiving surfaces of the sensing means can be varied, and that they are arranged to be interchangeable. Furthermore, the collector lenses may be of the zoom type whereby the intensity of light of the image on the sensing means, or the areas of the portions 17 and 20 of the image on the focusing screen can be varied by taking into account the size of the objective lens aperture.

Figure 4:
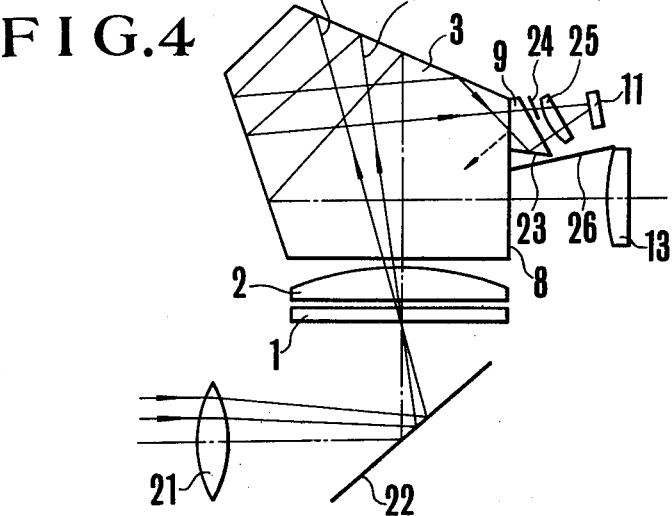
FIG. 4 is a similar view of a second embodiment of the invention.

In FIG. 4, there is shown a second embodiment of the invention differing from the first embodiment in that the first and second light value sensing means are combined to form a single sensing means 11 positioned to detect the photometric light beam with the respective boundary rays 14, 15, 18 and 19. As mentioned above, there are provided a light-shielding means 24 and a collector lens 25. In order to prevent any fraction of the view finder image forming light beam from entering the sensing means 11, there is provided a fixed light shielding means which is indicated at 26.

Figure 5:
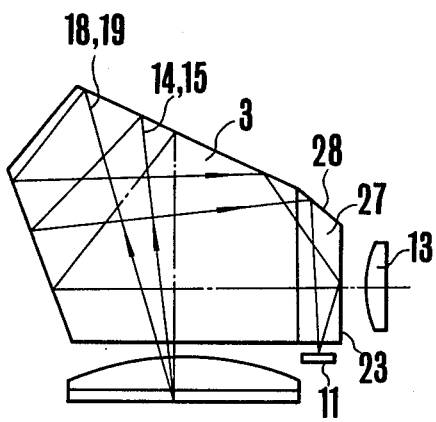
FIG. 5 is a similar view of a third embodiment of the invention.

In FIG. 5, there is shown a third embodiment of the invention wherein the supplementary optical means characteristic of the invention is constructed in the form of a glass plate 27 positioned in intimately contacting relation with the exit surface of the penta-prism 3 and having a reflection surface 23 and an angled reflection surface 28, the arrangement of these surfaces 23 and 28 being such that the photometric light rays are directed to a single light value sensing means 11 positioned adjacent the lower side of the plate 27 as well as near the entrance surface of the penta-prism 3.

Figure 6:
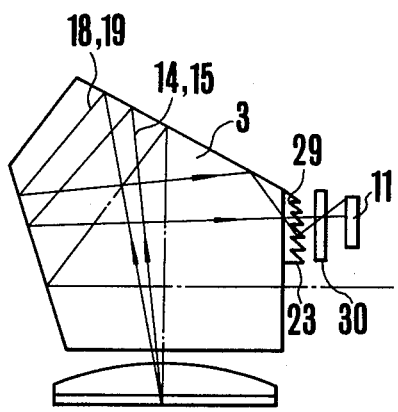
FIG. 6 is a similar view of a fourth embodiment of the invention.

In FIG. 6, there is shown a fourth embodiment of the invention somewhat similar to the second embodiment of the invention but differing therefrom in that a toothed glass plate 29 is employed in place of the glass The view-finder includes a beam splitter 72 arranged to deflect a fraction of the light radiated from the image on the focusing screen 1 to a light value sensing means 73. The parts 72 and 73 make a spot exposure determination. The light value sensing means 11 and 73 can be selectively coupled to the exposure meter 66 by switch means 74. 75 is a switch cooperating with the servo EE means 74. 75 is a switch cooperating with the servo EE changeover pin 34 in such a manner that when the pin 34 projects, or when the diaphragm preselecting ring A is set in the "Auto" position, the switch 75 is opened.

Figure 9:
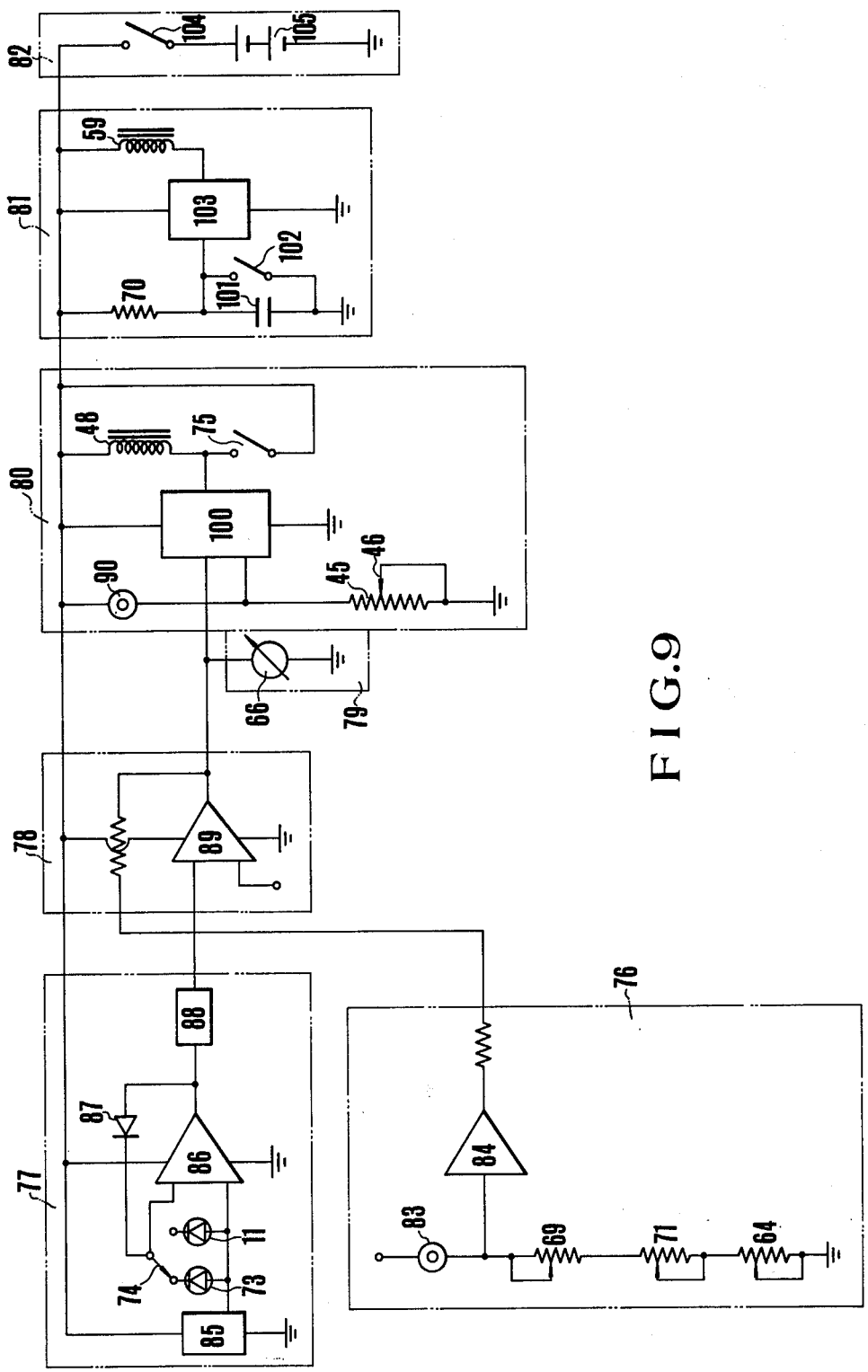
FIG. 9 is an electrical circuitry of the exposure control apparatus of the camera of FIG. 8.

FIG. 9 shows an electrical circuit of the exposure control apparatus shown in FIG. 8. The circuit comprises an exposure control parameter setting section 76, light value metering section 77, exposure value computing section 78, exposure value displaying section 79, diaphragm control section 80, shutter control section 81, and electrical power supplying section 82.

The exposure control parameters setting section includes the compensation resistor 64 of which the resistance value increases with increase in the largest aperture of the lens, the film speed setting resistor 71 of which the resistance value decreases with increase in the sensitivity of the film, the shutter speed setting resistor 69 of which the resistance value decreases with increase in the shutter speed connected in series to each other and to a constant current source 83. Connected to the interconnection between resistor 69 and current source 83 is the input of a buffer amplifier 84 of which the output is representative of information $Sv - Tv + Avc$, wherein $Sv$ is the film sensitivity; $Tv$ is the shutter speed; and $Avc$ is the compensation factor of the objective lens. This output is directed to the computing section 78.

The light value metering section 77 includes two light value sensing means 73 and 11 arranged to be selectively coupled by means of the switch 74 to an operational amplifier 86 associated with a bias circuit 85. The amplifier 86 is provided with a logarithmic compression element 87 connected in the feedback circuit thereof, so that the output of amplifier 86 may be combined with the information from the exposure control parameter setting section 76. The output of amplifier 86 is connected through a temperature compensation element 88 to the computing section 78, being representative of an information $Bv - (Avo + Avc)$, wherein $Bv$ is the object brightness level; and $Avo$ is the light value deviation due to the off-focus light metering.

The computing section 78 includes an operational amplifier 89 by which the outputs from sections 76 and 77 are added to produce an output representative of $Bv + Sv - Tv - Avo$. It is to be noted that variable $Avc$ is eliminated by adjusting the resistance value of resistor 64 in conformance to a variation of the light intensity on the light value sensing means resulted from a change of the type of the interchangeable objective lens. The variable $Avo$ which functions as an error can not be eliminated by the computation, but it may be neglected as has been discussed in connection with FIG. 1. Thus, the output of the computing section 78 is representative of $Bv + Sv - Tv$ proportional to the difference between the proper and largest aperture sizes.

The displaying section 79 comprises the exposure meter 66 arranged upon response to the output of the computing section 78 to indicate the proper diaphragm value in reference to the largest aperture of the objective lens. For this reason, the position of the diaphragm scale plate 67 of FIG. 8 cooperating the exposure meter 66 is adjusted by the differential pin 32 of different length with a different type objective lens.

The diaphragm control section 80 includes a comparator circuit 100 having two inputs, one of which is connected to the output of the computing section 78, and the other of which is connected to an interconnection between the variable resistor 45, 46 and a constant current circuit 90, and the solenoid of the electromagnet 48 connected to the output of the comparator 100. During the automatic diaphragm control period, the diaphragm setting ring 40 of FIG. 8 is turned from the largest aperture size position to the proper aperture size position to decrease the resistance value of resistor 45, 46, so that upon attainment of the resistance value of resistor 45, 46 to a level determined by the output of the computing section 78, the solenoid 48 is energized to arrest the diaphragm setting ring at a position for the proper aperture size. The automatic-manual selector switch 75 is connected across the solenoid 48.

The shutter control section 81 includes a trigger circuit 103 having an input connected to the output of a timing circuit containing the shutter speed setting resistor 70 and a condenser 101 and having an output connected to the solenoid of the electromagnet 59 upon attainment of the voltage of condenser 101 to a level dependent upon the preselected shutter speed for energizing the solenoid 59. Connected across the condenser 101 is a normally closed switch 102 which is opened when the front curtain is operated to run down.

The electrical power supplying section 82 comprises a battery 105 having a positive terminal connected through a power switch 104 to the positive bus of the circuitry of FIG. 9 and having a negative terminal which is grounded.

Operation

In order to make an exposure in the shutter preselection automatic exposure range, the diaphragm preselection ring A is turned to the "Auto" position, thereby the switch 75 is opened by the changeover pin 34, but the diaphragm presetting arm 31 remains held in the largest aperture size position by abutting engagement with the projection 44 of ring 40 under the action of the not shown spring. The differential pin 32 controls the positions of the resistor 64 and the diaphragm scale plate 67.

When the shutter release button 35 is depressed to the first stage, the power switch 104 is first closed to apply the output of computing section 78 to the comparator 100. This output can be read by the exposure meter 66. Upon further depression of the shutter release button, the lever 36 is turned counter clockwise to disengage the pawl 39 from the projection 43, thereby the ring 40 is turned clockwise together with arm 31 to vary the resistance value of resistors 45, 46. When the resistance value has reached the level determined by the output of computing section 78, the solenoid of magnet 48 is energized to turn the lever 49 in the counter-clockwise direction, thereupon the ring 40 is arrested to adjust the position of arm 31 in accordance with the output of the computing section 78. After that, the mirror 52 is moved upward, and then the automatic diaphragm control lever 53 is operated to vary the aperture size from the largest value to the computed value. Further the front curtain 58 is permitted to run down to the fully open position where the start switch 102 is opened. Upon termination of duration of the preselected shutter interval, the magnet 59 is operated causing the rear block 9, and that a Fresnel lens 30 is employed in place of the collector lens 25.

Figure 7:
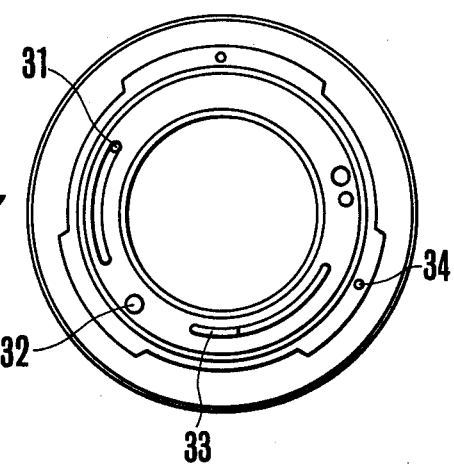
FIG. 7 is a rear view of an interchangeable objective lens mount for use with a single lens reflex camera body having a built-in exposure metering apparatus of the invention.

An example of application of the exposure metering apparatus to a single lens reflex camera equipped with a shutter preselection automatic exposure control range and adapted for use with a built-in exposure meter of the through-the-lens-metering kind will next be explained by reference to FIGS. 7, 8 and 9. The single lens reflex camera is shown in FIG. 8 as essentially comprising a lens aperture mechanism in an individual interchangeable objective lens mount of FIG. 7, a diaphragm control mechanism for setting the lens aperture size to a manually preselected or automatically controlled setting depending upon the exposure conditions, a mirror mechanism movable between viewing and non-viewing positions, a shutter mechanism for making an exposure, and a view-finder, each of which will be described successively.

The lens aperture mechanism includes a diaphragm presetting arm 31 cooperative with a rotatable diaphragm preselecting ring A, and an automatic diaphragm control lever 33 for controlling the movement of the diaphragm blades not shown between closed and opened positions in response to an actuation of the camera release member for varying the lens aperture size. The diaphragm presetting arm 31 is biased by a return spring in a counter-clockwise direction as viewed in FIG. 7 so that the arm 31 is automatically turned counter-clockwise as the diaphragm preselecting ring A is manually turned in a direction toward the decreasing aperture size setting. When the ring A is once set in an intermediate diaphragm size setting, the arm 31 can be moved in the clockwise direction but not in the counter-clockwise direction. When the ring is set in its "Auto" position, the arm 31 is located in the downmost position as viewed in FIG. 7. The lens mount of FIG. 7 further includes a differential pin 32 of which the length is dependent upon the largest aperture of the individual objective lenses. When the automatic diaphragm control member 33 is turned in a counter-clockwise direction, the position of the diaphragm blades is adjusted to a setting determined by the presetting arm 31. A servo EE changeover pin is indicated at 34.

The diaphragm control mechanism in the camera body includes a diaphragm setting ring 40 rotatable about the axis of the objective lens and biased by a spring 41 in a clockwise direction. In order to control the speed of rotation of the ring 40, there is provided a governor 42. The ring 40 has a first radially extending projection 43 arranged to be brought into engagement with the pawl 39 of a pivotal lever 36 cooperating with a shutter release button 35 when the film winding lever not shown is cocked, and a second projection 44 normally engaging with the diaphragm presetting arm 31. 45 is a resistance member affixed to ring 40 and constituting a variable resistor together with a slider 46, the arrangement of the resistance member 45 and the slider 46 being such that the resistance value of the variable resistor is decreased as the ring 40 is rotated in a clockwise direction under the action of spring 41 from the cocked position when the pivotal lever 36 is turned about a pivot pin 37 against the force of spring 38 to disengage the pawl 39 from projection 43. In order to arrest the rotating ring 40, there is provided a pivotal lever 49 arranged to be brought into engagement with one of the teeth 47 formed in a peripheral portion of the ring 40 when the solenoid of an electromagnet 48 cooperating with an armature affixed to the tail of lever 49 is energized to attract the armature thereby the lever 49 is turned about a pivot pin 50 in a counter-clockwise direction under the action of spring 51. When the solenoid of electromagnet 48 is deenergized, the lever 49 is turned in the clockwise direction under the force of spring 51 to permit rotation of ring 40.

The mirror mechanism comprises a tiltable mirror 52 which is pivoted upward when the ring 40 is arrested by the lever 49, or when the solenoid of electromagnet 48 is energized. In response to the upward movement of mirror 52, an actuating lever 53 cooperating with the automatic diaphragm control lever 33 begins to move until the lens aperture size is adjusted to the value determined by the exposure metering apparatus. After the diaphragm mechanism has been adjusted, the shutter mechanism is actuated to initiate an exposure.

The shutter mechanism includes front and rear curtains 58 which are controlled by coaxially mounted gears 57 and 62 respectively. The gear 57 is provided with a latching lever 55 pivotal at a pin 56 and arranged to be actuated in synchronism with the termination of the aperture size adjustment and the upward movement of the mirror 52. The lever 55 is biased by a return spring not shown, and its movement is limited by a stopper not shown. Upon movement of lever 55, the gear 57 begins to rotate, thereupon the front curtain runs down to the fully open position. The gear 62 is held in its cocked position by a latching lever 60 pivoted at a pin 61 and cooperating with an electromagnet 59 in such a manner that when the solenoid of electromagnet 59 is deenergized, the lever 60 is turned under the action of a spring not shown to permit movement of gear 62 which results in the running down of the rear curtain, thereby the exposure is terminated. These movable parts can be set to the cocked positioned by a film winding operation.

A variable resistor of which the resistance value is dependent upon the length of the differential pin 32 is indicated at 64. This resistor 64 performs the so-called "C" compensation. By the term "'C' compensation", it is meant to electrically compensate the deviation of the intensity of light on the sensing means from the value determined in conformance with the diaphragm value which is caused by a decrease in the intensity of the marginal portion of the image on the focusing screen when the camera is operated in the central spot weighted overall view field of light metering mode. The slider of the variable resistor 64 is biased by a spring 65 to introduce the factor of the differential pin 32 to the variable resistor 64. 66 is an exposure meter which indicates a diaphragm value determined by the "Appex" exposure value computation in reference to the largest aperture of the objective lens employed. In other words, the exposure meter 66 indicates how much the proper diaphragm value is different from the largest diaphragm value. 67 is a diaphragm scale which is shiftable in accordance with the length of the differential pin 32. This is because the exposure meter 66 indicates the proper diaphragm value in reference to the largest diaphragm value available in the lens. 68 is a shutter speed setting dial cooperating with first and second variable resistors 69 and 70, the first resistor 69 providing resistance values of arithmetic progression for the exposure value computing means, and the second resistor 70 providing resistance values of geometric progression for a timing means. 71 is a variable resistor for setting the sensitivity of the used film.

curtain to run down, thereby the exposure is terminated.

After the exposure operation is terminated, the power switch is opened and the various mechanisms of FIG. 8 are set to their cocked positions by manupulating any suitable cocking mechanism known in the art.

In order to make an exposure in the manual mode, the diaphragm preselecting ring A is turned from the "Auto" position to select a desired aperture size, thereby the switch 75 is turned on to render the magnet 48 inoperative. The diaphragm presetting arm 31 remains held in the largest aperture size position because of the engagement with projection 44 of ring 40, until the shutter release button is depressed permitting clockwise rotation of ring 40 to the position selected by the diaphragm preselecting ring A. The other operations subsequent to the above are similar to those shown in connection with the exposure in the shutter preselection automatic exposure range.

The present invention has been described in connection with a single lens reflex camera. But the embodiments of the present invention are not limited thereto, and could also involve other type reflex cameras. In each of the above mentioned embodiments, the pentaprism may be replaced by an equivalent optical structure such as made of a number of mirrors arranged to constitute the reflection surfaces.

What is claimed is:

1. A single lens reflex camera which comprises:
an objective lens;
a focusing screen on which an image of an object is formed by said objective lens;
a pentagonal roof prism which has a entrance surface, two roof surfaces, a front reflection surface and an exit surface;
an eyepiece facing the exit surface of the pentagonal roof prism;
an optical means having a first surface, a second surface and a third surface, said third surface being a total reflection surface, said first surface being cemented on the upper portion of the exit surface of the pentagonal roof prism, so that a light beam entering the entrance surface of the pentagonal roof prism from the focusing screen and reflected by the roof surfaces, the front reflection surface and again said roof surfaces to said upper portion of the exit surface of the pentagonal roof prism at an angle of total reflection can pass said exit surface of the pentagonal roof prism, and wherein said light beam having passed the exit surface of the pentagonal roof prism is reflected by said third surface of said optical means, said second surface having no total reflection angle with respect to a light beam coming from said third surface of said optical means and wherein a light beam entering the entrance surface of the pentagonal roof prism from the focusing screen and reflected by the roof surfaces and the front reflection surface to said upper portion of the exit surface of the pentagonal roof prism is passed through said first and second surfaces directly; and
photo detecting means to which a light beam passing through said second surface of the optical means is directed.

2. A single lens reflex camera according to claim 1, said optical means being a prism block which has a refractive index substantially equal to that of the pentagonal roof prism.

3. A single lens reflex camera according to claim 1, which further has a light detecting means to which another light beam, which is different from said light beam directed to said photo detecting means, is directed, and an output utilization means into which are supplied the output of said photo detecting means and light detecting means.

4. A single lens reflex camera according to claim 3, wherein said other light beam is a light beam entering the entrance surface of the pentagonal roof prism from the focusing screen and reflected by the roof surface and the front reflection surface and transmitted to said upper portion of the exit surface and said optical means.

5. A single lens reflex camera according to claim 4 which further has a light-shielding means positioned at the rear of the exit surface of the pentagonal roof prism and located in a space between the photo detecting means beam and the eyepiece to block any light beam externally entering the eyepiece from reaching the photo detecting means.

6. A single lens reflex camera according to claim 1 which further has a light deflecting means which directs another light beam which is different from said light beam to said photo detecting means.

7. A single lens reflex camera according to claim 1 which further has a light collecting means positioned between said second surface of the optical means and photo detecting means.

* * * * *